(12) United States Patent
Doumen

(10) Patent No.: US 8,594,330 B2
(45) Date of Patent: Nov. 26, 2013

(54) PERSONALIZED WHITEBOX DESCRAMBLERS

(75) Inventor: Jeroen Mathias Doumen, Hoofddorp (NL)

(73) Assignee: Irdeto Corporate B.V. (NL)

( * ) Notice: Subject to any disclaimer, the term of this patent is extended or adjusted under 35 U.S.C. 154(b) by 80 days.

(21) Appl. No.: 13/070,003

(22) Filed: Mar. 23, 2011

(65) Prior Publication Data

US 2011/0235803 A1 Sep. 29, 2011

(30) Foreign Application Priority Data

Mar. 26, 2010 (EP) .................................. 10157952

(51) Int. Cl.
*H04K 1/04* (2006.01)
(52) U.S. Cl.
USPC .......................................... 380/255; 380/287
(58) Field of Classification Search
None
See application file for complete search history.

(56) References Cited

U.S. PATENT DOCUMENTS

2010/0098255 A1* 4/2010 Ciet et al. ..................... 380/277
2010/0299515 A1* 11/2010 Michiels et al. .............. 713/150

FOREIGN PATENT DOCUMENTS

| WO | WO-2005/062919 A2 | 7/2005 |
| WO | WO-2007/116390 A2 | 10/2007 |
| WO | WO-2008/084433 A2 | 7/2008 |

OTHER PUBLICATIONS

"European Application No. EP 10 15 7952, European Search Report dated Jul. 8, 2010", 4 pgs.
Billet, Olivier, et al., "A Traceable Block Cipher", Asiacrypt, International Conference on the Theory and Application of Cryptology and Information Security, LNCS 2894, (Nov. 1, 2003), 331-346.
Chow, Stanley, et al., "White-Box Cryptography and an AES Implementation", Proceedings of the 9th Annual Workshop on Selected Areas in Cryptography, vol. 2595 (Aug. 2002), (Jan. 1, 2003), 250-270.

* cited by examiner

*Primary Examiner* — Brandon Hoffman
*Assistant Examiner* — Nega Woldemariam
(74) *Attorney, Agent, or Firm* — Hayes Soloway P.C.

(57) ABSTRACT

The invention prevents intercepted keys from being used in unauthorized whitebox descrambler modules for the decryption of a ciphertext. Hereto a receiver with a personalized whitebox descrambler is proposed, whereby a part of the descrambling operation of the personalized descrambler is performed in a preprocessing module external to the descrambler.

20 Claims, 14 Drawing Sheets

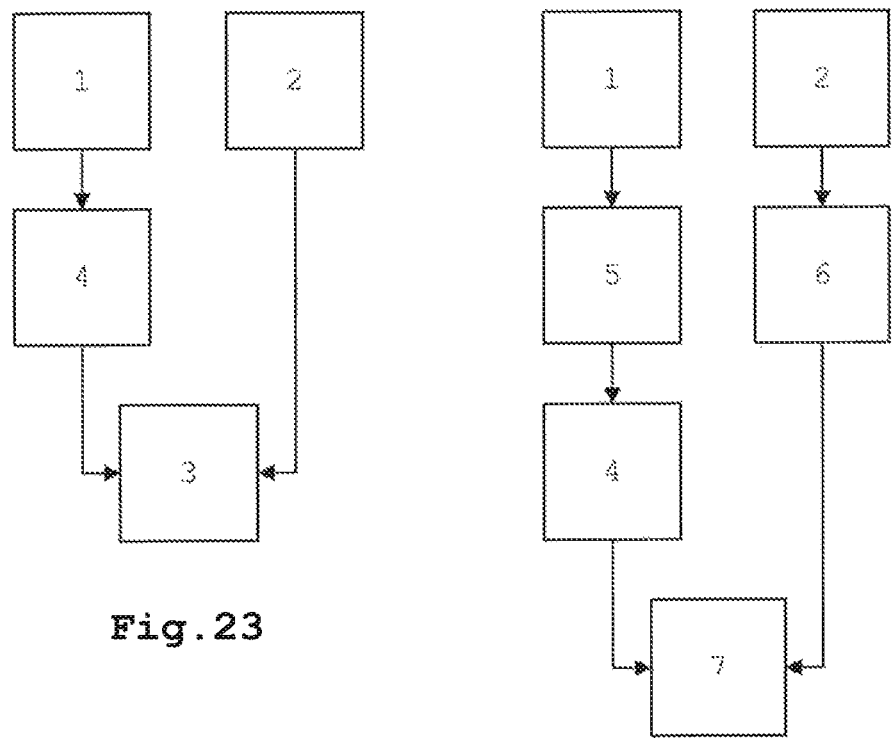
Fig.23
Fig.24
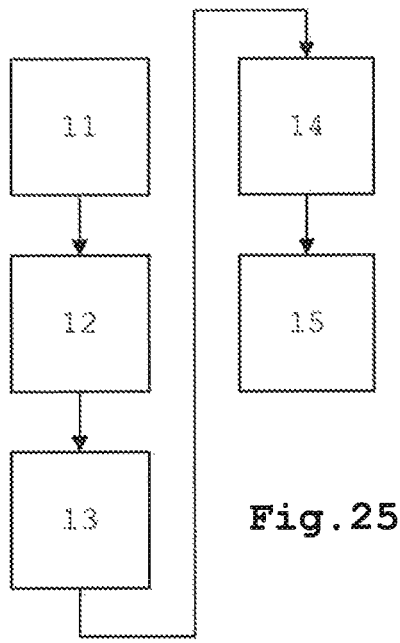
Fig.25

US 8,594,330 B2

PERSONALIZED WHITEBOX DESCRAMBLERS

CLAIM OF PRIORITY

The present patent application claims the benefit of priority under 35 U.S.C. §119 to European Patent Application No. 10157952.2, filed Mar. 26, 2010, the entire contents of which is incorporated herein by reference in its entirety.

FIELD OF THE INVENTION

The present invention relates to whitebox descramblers. More specifically, the invention relates to whitebox descramblers in receivers of a conditional access system.

BACKGROUND

In Pay TV applications an encrypted (scrambled) broadcast stream forms a ciphertext 'C' that is decrypted (descrambled) in a broadcast receiver to obtain a descrambled broadcast stream 'M'. Typically, multiple broadcast receivers receive the same broadcast stream and decrypt the broadcast stream with the same key (Control Word) 'CW'. The value of the CW is updated regularly and is delivered to the receivers in encrypted form in an entitlement control message 'ECM' that can be decrypted by authorized subscribers.

ECM processing can be implemented in various manners. FIG. 1a shows an example wherein ECM processing is implemented in a smartcard, which uses hardware tamper resistance techniques to provide a secured execution environment. Decryption of the broadcast stream C is implemented in a hardware circuit 301 of a chip in a receiver 101 for the obtainment of a descrambled broadcast stream, denoted by 'M'. A secure client 201 is implemented in hardware of the smartcard for obtaining a CW from an ECM. Hardware tamper resistance technology secures the implementation against attacks.

FIG. 1b shows an alternative example, wherein ECM processing is based on software techniques. The software runs as a software secure client 202 in a receiver 102 and loads the keys (CWs) into a hardware descrambler 301 of the receiver 102 in encrypted form based on a key hierarchy loaded in the descrambler chip.

FIG. 1c shows another alternative example, wherein the both a secure client 202 and a descrambling function 302 of a receiver 103 are implemented in software. The software implemented receiver 103 lacks a hardware hook, such as e.g. a chipset unique key 'CSUK' or a chipset serial number 'CSSN' stored in a read-only memory of a chipset. As a result, the descrambling function 302 cannot be restricted to a particular receiver based on such hardware hook, making the software implemented receiver 302 more vulnerable to hacking attacks.

FIG. 2a shows an example of a descrambler module. A ciphertext C is decrypted in the descrambler module 303 with a fixed key K into a plaintext M. The key K is embedded or preloaded in the descrambler module 303.

FIG. 2b shows an alternative descrambler module, wherein several instances of a descrambler module 304 can be made by loading values of K from an external source.

Many existing broadcast descrambling algorithms, such as DVB (digital video broadcasting), DES (data encryption standard) and AES (advanced encryption standard), are based on block ciphers. Block ciphers operate by dividing an input ciphertext stream in fixed sized blocks. Each block is processed by repeatedly applying a relatively simple function. This approach is known as iterated block cipher. Each iteration is called a round, and the repeated function is called a round function. Typical block ciphers have 4 to 32 rounds.

FIG. 3 shows a typical inner working of a prior art iterated block cipher 305 as may be used as the descrambling module 304 of FIG. 2b. A ciphertext C is received and divided in blocks. Each block of ciphertext C is processed over 'n' rounds into the plaintext message 'M'. Each round 'r' receives its own round key '$RK_r$' as input, which is calculated from the original key 'K' in a key schedule module 501. In whitebox cryptography, each block cipher round module 4011,4012 is typically implemented using a sequence of table lookup operations hiding the value of the key 'K' and the roundkeys '$RK_r$'.

Alternatively, a fixed-key variant using a descrambling module 303 as shown in FIG. 2a may be used in the iterated block cipher 305. The key schedule module 501 as shown in FIG. 3 is then replaced by a module embedding a fixed input '$RK_r$' to each round.

A block cipher round module 4011,4012 as shown in FIG. 3 is shown in more detail in FIG. 4. The block cipher round function 401 contains two modules that operate in sequence. A diffusion module 601 modifies an input $C_{r-1}$ randomly. The thus obtained $C'_{r-1}$ is input to a confusion module 701. The purpose of the confusion module 701 is to mix the round key $RK_r$ with the ciphertext $C'_{r-1}$, making it mandatory to provide the relevant round key $RK_r$ to produce the output $C_r$ for the next decryption round.

A block cipher round module may be personalized by having a unique function, in whitebox cryptography typically using a table-driven lookup implementation, that performs the confusion function. An example of a prior art table-driven lookup implementation will be described in more detail with FIG. 7.

A whitebox iterated block cipher using AES encryption is known from "White-Box Cryptography and an AES Implementation" by S. Chow, P. Eisen, H. Johnson, P. C. van Oorschot, Proceedings of the 9th Annual Workshop on Selected Areas in Cryptography, August 2002. In the whitebox implementation of AES each block cipher round consists of four parts: SubBytes, ShiftRows, MixColumns and AddRoundKey. The first three parts correspond to the operations in the diffusion module and the AddRoundKey part is comparable to the confusion module.

To protect intermediate values that are passed from one module to the next from being interceptable, whitebox iterated block cipher implementations typically apply a random permutation to the output of lookup tables (see also FIG. 7), and the inverse of that permutation to the input of a next lookup table.

A simplified block cipher 306 applying a random permutation consisting of two rounds in block cipher round modules 4021 and 4022 and with a block and key size of two bits is shown in FIG. 5. In FIG. 6 a block cipher round module 402 is shown in mode detail. In FIG. 5 each arrow represents a dataflow of two bits. In FIG. 6 each arrow represents a single bit data flow. The diffusion module 602 swaps the two bits of input $C_{r-1}$ and replaces the second bit by their binary sum (XOR). The thus obtained $C'_{r-1}$ is input to the confusion module 702. The confusion module 702 performs a binary addition (XOR) of the two input bits of $C'_{r-1}$ with the relevant bit of the round key $RK_r$. With reference to FIG. 5, the key schedule module 502 receives a key K and generates the two round keys '$RK_1$=K' and '$RK_2$=K $\oplus$ 10' where '10' denotes a binary vector and $\oplus$ is a XOR operation.

A simplified example of a whitebox lookup table driven implementation 307 of the simplified block cipher 306 of FIG. 5 and FIG. 6 is shown in FIG. 7. In the example of FIG.

7, the key schedule module 503 receives a binary key 'K=11' and expands the key K into two round keys: '$RK_1$=11' and '$RK_2$=01' using a table lookup. The table lookup is visualized by the predefined paths following a particular key input. Following the arrows for key input K=11, the two round keys 11 and 01 are found. For the input ciphertext, in this example having a binary value 'C=11', the first block cipher round module 4031 uses a table lookup in the diffusion module 603 to produce the intermediary output '$C'_0$32 10', which is input to the confusion module 703. The confusion module 703 adds the round key $RK_1$ resulting in the output '$C_1$=01' that is input to the second block cipher round module 4032. In the second block cipher round module 4032, in a similar manner the diffusion module 603 obtains '$C'_1$=11' and the confusion module 703 obtains '$C_2$=10'. The second block cipher round module 4032 generates the cleartext message 'M' as the output of the block cipher decryption operation: 'M=C2=10'.

As an alternative to using block ciphers as broadcast descrambling algorithm, stream ciphers and public key cryptosystems are known.

FIG. 17 shows a typical inner working of a prior art stream cipher 308 as may be used as an alternative descrambling module 304 of FIG. 2b. A setup module 5041 initializes the internal state of the cipher in a manner known per se. Initialization typically involves an initial vector (IV) that is loaded into a keyed internal secret state of the cipher, after which a number of cipher rounds is executed on an input key K prior to releasing an initialized key to the next module. A key expansion module 5042 creates an expanded key EK from the initialized key to match the size of the ciphertext C. The expanded key EK is provided to a XOR module 404, where an input ciphertext C is descrambled using a XOR operation with the expanded key EK.

FIG. 20 shows a typical inner working of a prior art public key cipher 309 as may be used as another alternative descrambling module 304 of FIG. 2b. An exponentiation module 505 processes an input key K, typically by applying a modular exponentiation like '$EK=G^K$ mod N'. The thus obtained expanded key EK is input to a decipher module 4052 for deciphering an input ciphertext C. As part of the deciphering of ciphertext C, the ciphertext C may be modified in modification module 4051 into an intermediate ciphertext $C_1$ prior to being input to the decipher module 4052.

A known problem in Pay TV application is the redistribution of CW key values using broadband communication infrastructures such as the Internet. Hackers intercept CW values and insert the CW values into a redistribution infrastructure, e.g. using a peer-to-peer network. Unauthorized receivers obtain the appropriate CW key values from the redistribution infrastructure and use the thus obtained CW values to decrypt a broadcast stream. More specifically, intercepted keys are used in unauthorized whitebox descrambler modules for the decryption of a ciphertext.

SUMMARY OF THE INVENTION

It is an object of the invention to prevent intercepted keys from being used in unauthorized whitebox descrambler modules for the decryption of a ciphertext.

According to an aspect of the invention a whitebox descrambler is proposed for descrambling a ciphertext to obtain a cleartext message. The descrambler is configured to receive a personalized transformed key from an external preprocessing module. The descrambler is further configured to receive the input ciphertext. The descrambler is further configured to generate an output data by applying a second part of a descrambling operation to the input ciphertext using the personalized transformed key as an input to the second part of the descrambling operation. The descrambler is further configured to apply an inverse transformation to the personalized transformed key before generating the output data. The personalized transformed key comprises preprocessed data as a result of applying a first part of the descrambling operation in the external preprocessing module.

According to an aspect of the invention a method is proposed for use in a whitebox descrambler for descrambling a ciphertext to obtain a cleartext message. The method comprises receiving a personalized transformed key from an external preprocessing module. The method further comprises receiving the input ciphertext. The method further comprises generating an output data by applying a second part of a descrambling operation to the input ciphertext using the personalized transformed key as an input to the second part of the descrambling operation. The method further comprises applying an inverse transformation to the personalized transformed key before generating the output data. The personalized transformed key comprises preprocessed data as a result of applying a first part of the descrambling operation in the external preprocessing module.

The inverse transformation is either performed as a separate distinguishable step or integrated in the second part of the descrambling operation. If the inverse transformation is integrated in the second part of the descrambling operation, a single mathematical operation may perform both the inverse transformation and the descrambling operation.

In the external preprocessing module the preprocessed data is generated by applying the first part of the descrambling operation to a decryption key. In a conditional access system this key is also known as a control word.

By performing the first part of the descrambling operation outside the descrambler and furthermore personalize the resulting modified key by transforming the result such that only a particular (i.e. authorized) descrambler can inverse the transformation, intercepting the personalized transformed key for redistribution to another receiver advantageously becomes useless. The other receiver would have to inverse the transformation and have knowledge of the second part of the descrambling operation as implemented in the particular authorized receiver, which is substantially impossible.

The embodiments of claims 2 and 12 enable use of iterated block cipher based descramblers. Advantageously, intercepted keys for an authorized iterated block cipher based descrambler cannot be used in an unauthorized iterated block cipher based descrambler.

The embodiments of claims 3-6 and claims 13-15 advantageously enable various alternative implementations of iterated block cipher based descramblers.

The embodiment of claim 7 enables use of stream cipher based descramblers and public key based descramblers. Advantageously, intercepted keys for an authorized stream cipher based descrambler or an authorized public key based descrambler cannot be used in an unauthorized stream cipher based descrambler or an unauthorized public key based descrambler.

According to an aspect of the invention a receiver is proposed for use in a conditional access system. The receiver comprises a descrambler having one or more of the above mentioned features.

Thus, the descrambler can advantageously be integrated in a receiver, enabling the descrambler to be used in a conditional access system.

According to an aspect of the invention a secure client is proposed for use in a conditional access system. The secure client comprises an input for receiving an encrypted control word from a head-end system via the intermediary of a receiver. The secure client further comprises a memory configured to store a product key. The secure client further comprises a decryption module configured to decrypt the encrypted control word using the product key to obtain the control word. The secure client further comprises a preprocessing module configured to apply a first part of a descrambling operation to the control word to obtain a modified control word and to transform the modified control word to obtain a personalized transformed control word. The secure client further comprises an output for providing the personalized transformed control word to the receiver.

According to an aspect of the invention a method is proposed for use in a secure client of a conditional access system. The method comprises receiving an encrypted control word from a head-end system via the intermediary of a receiver. The method further comprises decrypting the encrypted control word using a product key from a memory to obtain the control word. The method further comprises applying a first part of a descrambling operation to the control word to obtain a modified control word. The method further comprises transforming the modified control word to obtain a personalized transformed control word. The method further comprises providing the personalized transformed control word to the receiver.

In the preprocessing module preprocessed data is generated for use in a second part of the descrambling operation in a descrambler module of the receiver. The first part of the descrambling operation is typically applied to a decryption key. In a conditional access system this key is known as the control word.

By performing the first part of the descrambling operation outside the descrambler and furthermore personalize the resulting modified key by transforming the result such that only a particular (i.e. authorized) descrambler can inverse the transformation, intercepting the personalized transformed key for redistribution to another receiver advantageously becomes useless. The other receiver would have to inverse the transformation and have knowledge of the second part of the descrambling operation as implemented in the particular authorized receiver, which is substantially impossible.

According to an aspect of the invention a head-end system is proposed for use in a conditional access system. The head-end system comprises a preprocessing module configured to apply a first part of a descrambling operation to a control word to obtain a modified control word and to transform the modified control word to obtain a personalized transformed control word. The head-end system further comprises an output for providing the personalized transformed control word and a ciphertext to a receiver according having one or more of the above mentioned features.

In the preprocessing module preprocessed data is generated for use in a second part of the descrambling operation in a descrambler module of the receiver. The first part of the descrambling operation is typically applied to a decryption key. In a conditional access system this key is known as the control word.

By performing the first part of the descrambling operation outside the descrambler and furthermore personalize the resulting modified key by transforming the result such that only a particular (i.e. authorized) descrambler can inverse the transformation, intercepting the personalized transformed key for redistribution to another receiver advantageously becomes useless. The other receiver would have to inverse the transformation and have knowledge of the second part of the descrambling operation as implemented in the particular authorized receiver, which is substantially impossible.

According to an aspect of the invention a computer program element is proposed. The computer program element is, when being executed by a processor, adapted to carry out a method for use in a whitebox descrambler having one or more of the above mentioned features.

This advantageously enabled the descrambler to be implemented in software.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which:

FIG. 23 shows a method in a whitebox descrambler of an exemplary embodiment of the invention;
FIG. 24 shows a method in a whitebox descrambler of another exemplary embodiment of the invention;
and FIG. 25 shows a method in a secure client of an exemplary embodiment of the invention.

DETAILED DESCRIPTION OF THE DRAWINGS

The invention prevents intercepted keys from being used in unauthorized whitebox descrambler modules for the decryption of a ciphertext. Hereto a receiver with a personalized whitebox descrambler is proposed, such as e.g. shown in FIG. 9, whereby a part of the descrambling operation of the personalized descrambler is performed in a preprocessing module external to the descrambler.

Figure 9:
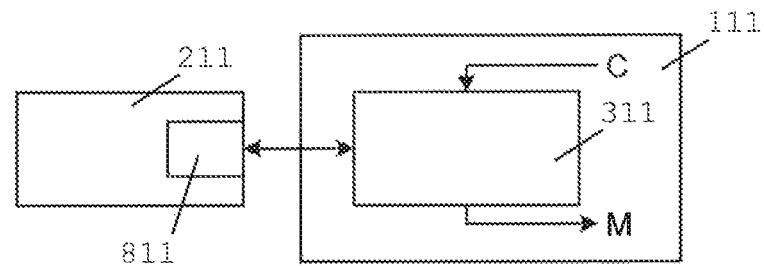
FIG. 9 shows a receiver and a secure client of an exemplary embodiment of the invention.

With reference to FIG. 9, the personalized descrambler 311 is typically implemented as an obfuscated software module in the receiver 111. Alternatively, the personalized descrambler may be implemented in programmable hardware. Each receiver in a conditional access network typically has a unique personalized descrambler 311. A secure client 211 is typically communicatively connected to the receiver 111 to provide descrambler specific key related data to the personalized descrambler 311 to achieve a common descrambling function. Hereto, the secure client 211 is implemented such that a part of the descrambling operation of the personalized descrambler 311 is performed in a preprocessing module 811 of the secure client 211. The secure client 211 is typically implemented in hardware of a smartcard. The preprocessing module 811 may be implemented as an obfuscated software module running in the secure client 211.

Alternatively the descrambler specific key related data is provided from a head-end system to the receiver, possibly via the intermediary of a smartcard. The preprocessing module 811 is then a part of the head-end system.

The personalized whitebox descrambler of the invention uses the descrambler specific preprocessed key-related data as input.

In conditional access systems the wording 'CW' or 'control word' is a synonym of a 'key'.

Figure 8:
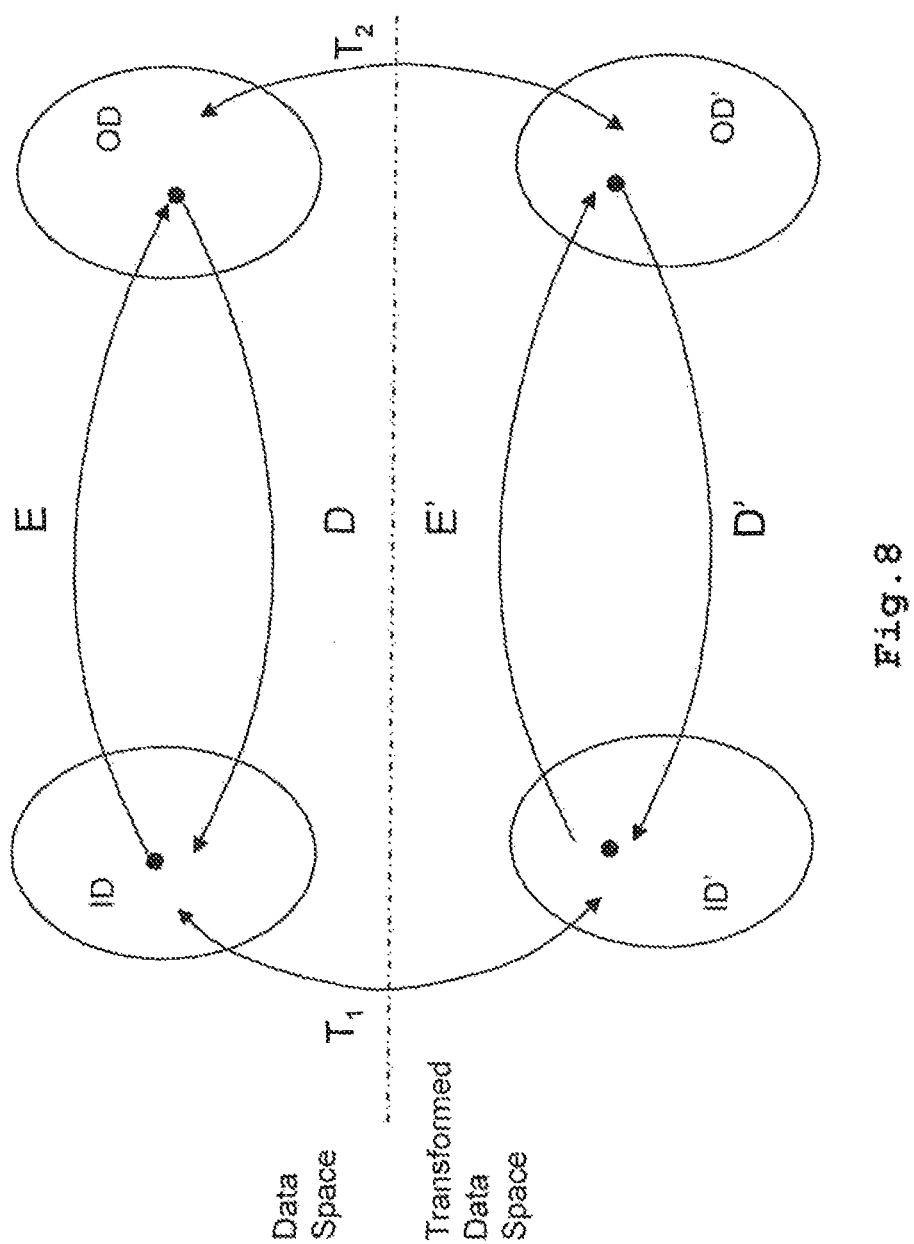
FIG. 8 shows a diagram clarifying transformation functions and encryption in general terms.

Software obfuscation techniques make use of transformation functions to obfuscate intermediate results. The concept of transformation functions differs from encryption, which is clarified in general with reference to FIG. 8.

Assume there exists an input domain ID with a plurality of data elements in a non-transformed data space. An encryption function E using some key is defined that is configured to accept the data elements of input domain ID as an input to deliver a corresponding encrypted data element in an output domain OD. By applying a decryption function D, the original data elements of input domain ID can be obtained by applying the decryption function D to the data elements of output domain OD. In a non-secure environment (typically referred to as "white box"), an adversary is assumed to know the input and output data elements and the encryption function E, such that the key can be derived.

Additional security can be obtained in a non-secured environment by applying transformation functions to the input domain ID and output domain OD, i.e. the transformation functions are input- and output operations. Transformation function $T_1$ maps data elements from the input domain ID to transformed data elements of transformed input domain ID' of a transformed data space. Similarly, transformation function $T_2$ maps data elements from the output domain OD to the transformed output domain OD'. Transformed encryption and decryption functions E' and D' can now be defined between ID' and OD' using transformed keys. $T_1$ and $T_2$ are bijections.

Using transformation functions $T_1$, $T_2$, together with encryption techniques implies that, instead of inputting data elements of input domain ID to encryption function E to obtain encrypted data elements of output domain OD, transformed data elements of domain ID' are input to transformed encryption function E' by applying transformation function $T_1$. Transformed encryption function E' combines the inverse transformation functions $T_1^{-1}$ and/or $T_2^{-1}$ in the encryption operation to protect the confidential information, such as the key. Then transformed encrypted data elements of domain OD' are obtained. By performing $T_1$ and/or $T_2$ in a secured portion, keys for encryption functions E or decryption function D cannot be retrieved when analyzing input data and output data in the transformed data space.

One of the transformation functions $T_1$, $T_2$ should be a non-trivial function. In case, $T_1$ is a trivial function, the input domains ID and ID' are the same domain. In case, $T_2$ is a trivial function, the output domains are the same domain.

In white box cryptology, it is assumed that this process is performed completely in a hostile environment, wherein an attacker has access to the data elements in ID, OD and the functions E and D. White box cryptology provides security by securing (parts of) the keys for the functions E and D. By applying transformation functions $T_1$ and $T_2$ in at least one of the smart card or a secured portion the receiver, the lookup tables $L_n$ as applied in white box cryptology cannot be resolved in the transformed space.

The software implementations of the secure client and the descrambler use software transformations to secure software applications. Transformations are typically used in whitebox cryptography, wherein a decryption key is merged with the decryption steps of the algorithm to achieve a software program that can decrypt a ciphertext C.

Figure 1A:
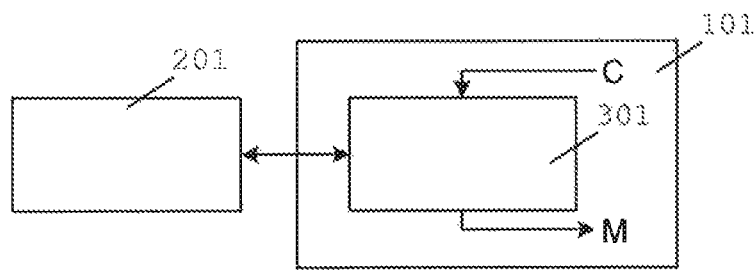
FIG. 1a shows a prior art receiver and secure client.
Figure 1B:
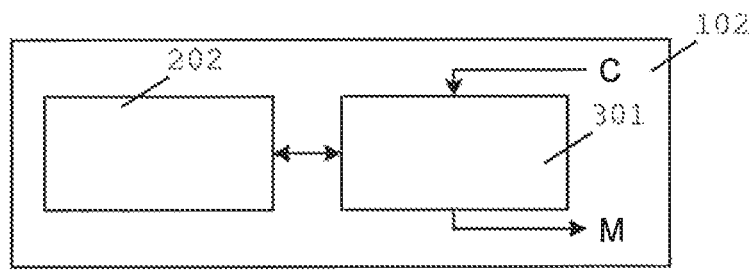
FIG. 1b shows another prior art receiver and secure client.
Figure 1C:
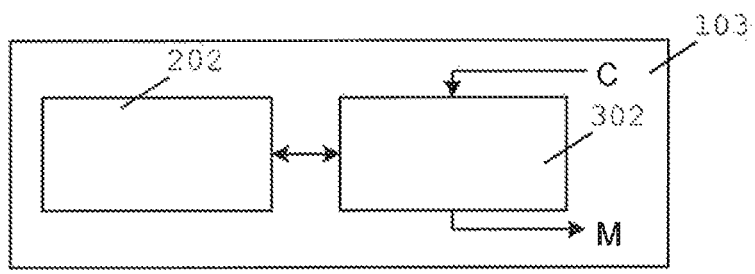
FIG. 1c shows another prior art receiver and secure client.
Figure 2A:
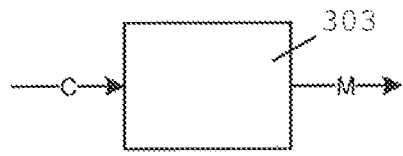
FIG. 2a shows a block diagram of a prior art descrambler.
Figure 2B:
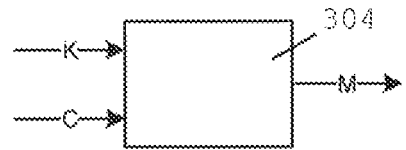
FIG. 2b shows another block diagram of a prior art descrambler.
Figures 10A, 10B:
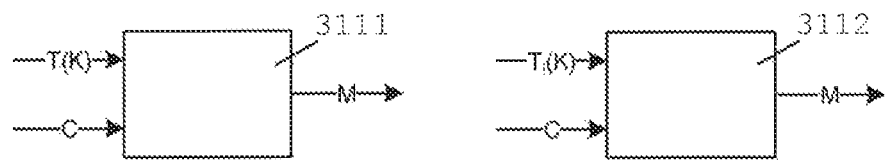
FIG. 10a shows a block diagram of a descrambler of an exemplary embodiment of the invention.
FIG. 10b shows block diagram of a descrambler of another exemplary embodiment of the invention.

FIG. 10a shows a whitebox implementation of FIG. 2b, wherein a key is provided to a decryption module 3111 in a transformed format. The transformed key T(K) is loaded in the whitebox implementation of the decryption module 3111. The decryption module 3111 transforms T(K) to obtain the key K before applying a descrambling operation with the key K. The implementation of the decryption module 3111 ensures that an attacker with knowledge of the decryption module 3111 and the value of T(K) cannot recover K. In variants of this scheme, the ciphertext input C and/or the decrypted output M can be transformed as well.

FIG. 10b shows a personalized whitebox descrambler 3112 that uses descrambler specific key-related data $T_i(K)$ that has been preprocessed prior to being input to the whitebox descrambler 3112. The index 'i' is used to indicate the specific descrambler 3112. The preprocessed key related data $T_i(K)$ is construed such that it can be used in the corresponding personalized whitebox descrambler 3112 only. Thereto, each receiver uses a personalized transformation $T_i$ of the key.

The transformed key $T_i(K)$ is loaded in the whitebox implementation of the descrambler 3112 for decrypting the broadcast stream C. The implementation of the descrambler 3112 ensures that an attacker with knowledge of the implementation and the value of $T_i(K)$ cannot recover the key K. Moreover the attacker will not be able to generate key-related data $T_j(K)$ for another receiver (indicated by 'j'), which receiver has a personalized whitebox descrambler using a personalized transformation $T_j$.

Figure 5:
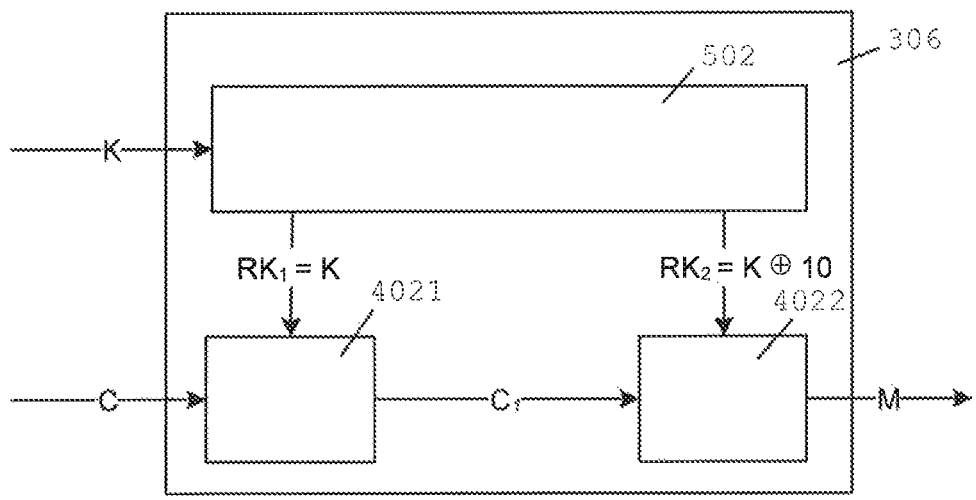
FIG. 5 shows another prior art descrambler in more detail.
Figure 6:
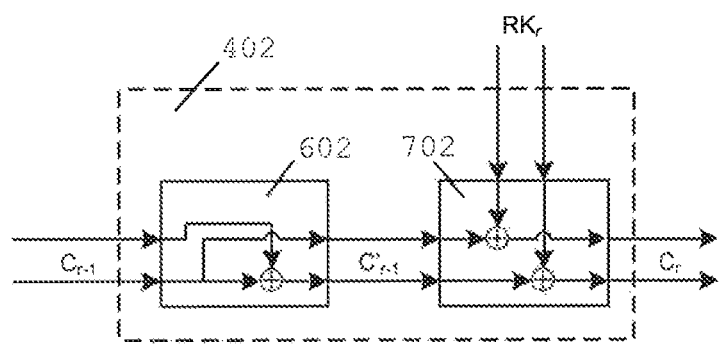
FIG. 6 shows another prior art block cipher round module.
Figure 17:
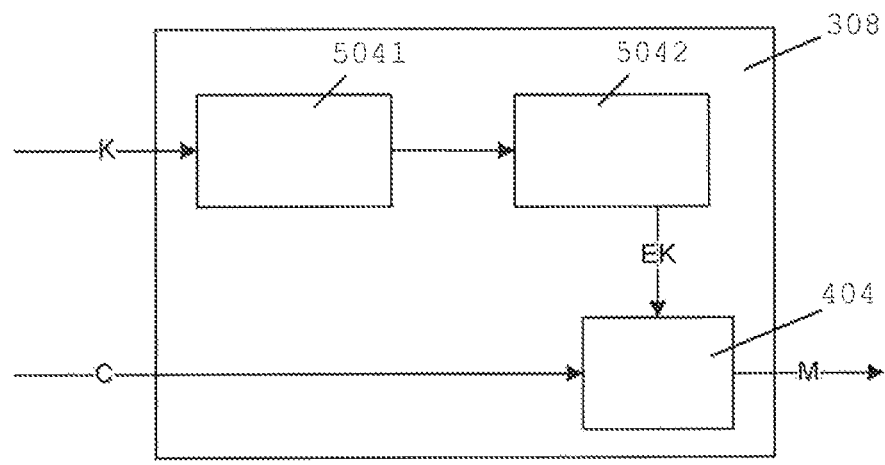
FIG. 17 shows a prior art stream cipher based descrambler.
Figure 20:
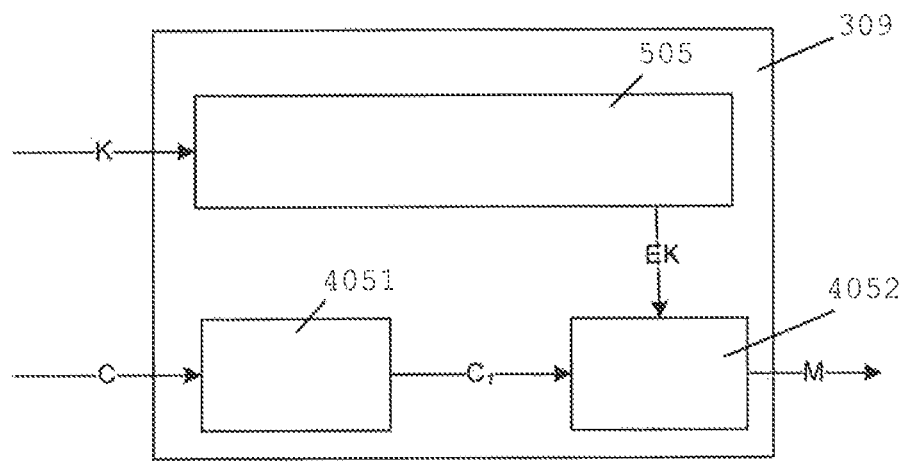
FIG. 20 shows a prior art public key based descrambler.

With known descramblers, such as e.g. shown in FIG. 5, FIG. 17 and FIG. 20, the input key K could be intercepted and redistributed to other receivers for descrambling a broadcast stream C. Because the key related data $T_i(K)$ is unique to a receiver, the key related data $T_i(K)$ is useless for any other receiver. Hence, intercepting the input key related data $T_i(K)$ and redistribution to other receivers is advantageously no longer is useful.

Figure 11:
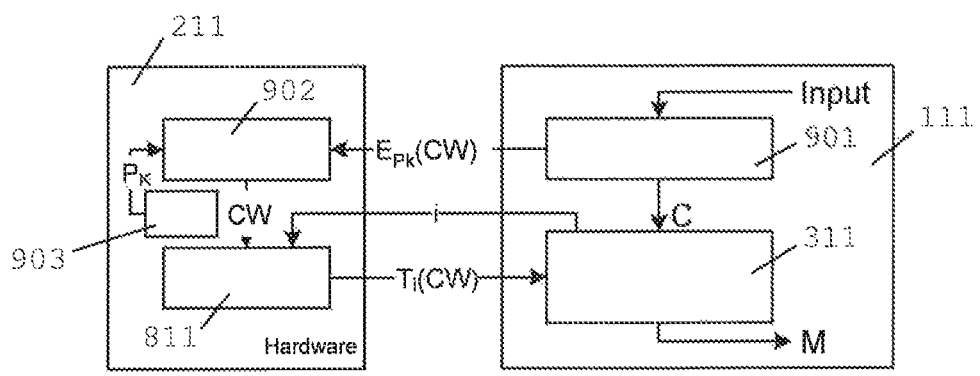
FIG. 11 shows a receiver and a secure client of another exemplary embodiment of the invention.

FIG. 11 shows a more detailed example of a receiver 111 with a personalized whitebox descrambler 311 of an exemplary embodiment of the invention. In the example of FIG. 11 a personalized key data $T_i(CW)$ is generated by preprocessing a CW in a secure client 211 of a smartcard. More specifically, a preprocessing module 811 is used in the secure client 211 to preprocess the CW outside the descrambler 311 of the receiver 111. Herewith, a part of the descrambling operation of the personalized descrambler 311 is performed in the preprocessing module 811. The preprocessing module 811 performs a transformation function before providing the personalized key data $T_i(CW)$ to the descrambler 311. Alternatively the CW may be preprocessed in a preprocessing module of a head-end system and transmitted to the receiver from the head-end system to the receiver, possibly via the intermediary of a smartcard.

The receiver 111 receives an input stream 'input' from a broadcast network in a manner known per se. In a conditional access system the input stream is typically an MPEG-2 or DVB transport stream and contains multiple TV channels (i.e. program streams) as well as encrypted information containing the keys required for descrambling a program stream. For the descrambling of a program stream, the key is commonly called a Control Word or CW. A demux/filter module 901 in the receiver 111 forwards a part of the transport stream that corresponds to a user selected program stream 'C', which is a ciphertext, to the descrambler 311. The demux/filter module 901 further extracts to the program stream C relevant information from the encrypted information, such as Entitlement Management Messages (EMM) and Entitlement Control Messages (ECM), and sends the information to the secure client 211. The ECM contains the CW encrypted with a product key $P_K$, which is shown in FIG. 11 as $E_{PK}(CW)$. The secure client 211 receives the ECM and decrypts it in a decryption module 902 with a pre-stored $P_K$ value read from a secured key storage module 903. The preprocessing module 811 processes the CW into a descrambler specific transformed form $T_i(CW)$. The descrambler specific CW transformation in the secure client 211 is linked to the personalized descrambler 311 in the receiver 111 using knowledge of the receiver identity 'i', which may be communicated from the descrambler 311 to the preprocessing module 811. A part of the descrambling operation of the personalized descrambler 311 is performed in the preprocessing module 811.

Use of the transformed key $T_1(CW)$ in the personalized descrambler 311 needs to be secure. This means that it should be difficult to obtain the CW from the transformed key $T_i(CW)$ and from the personalized descrambler 311. Moreover, it should be hard to calculate a valid transformed key for a different particular personalized descrambler 111.

The following exemplary embodiments show how a personalized descrambler may be secured using personalized whitebox descramblers based on block ciphers.

Figure 3:
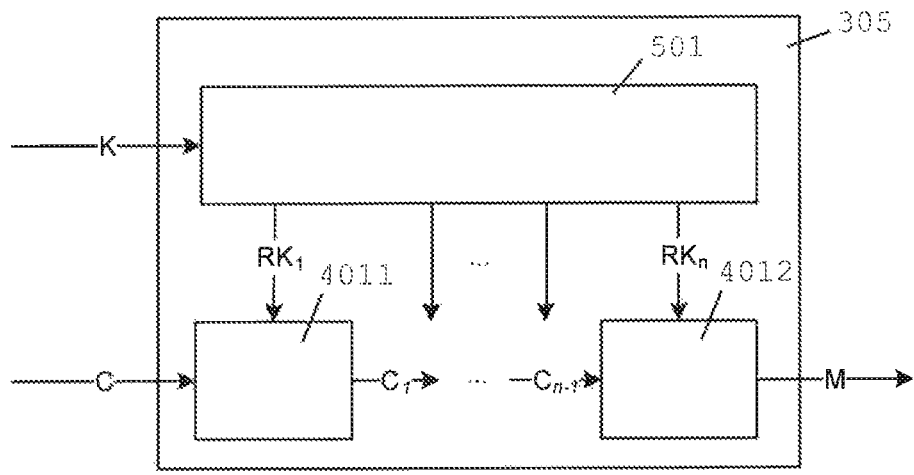
FIG. 3 shows a prior art descrambler in more detail.
Figure 12:
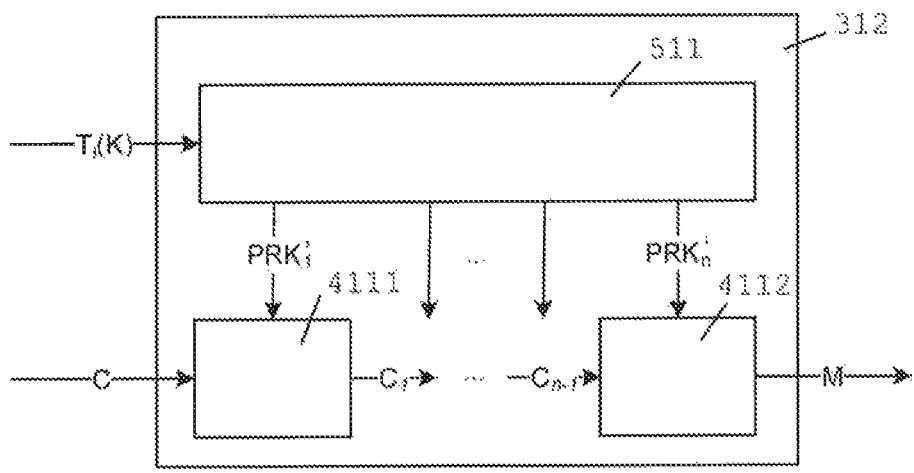
FIG. 12 shows a descrambler of an exemplary embodiment of the invention.

In the exemplary embodiment of FIG. 12, the personalized descrambler is a personalized block cipher 312. Similar to the block cipher 305 as shown in FIG. 3, a block of ciphertext C is processed over 'n' rounds into a plaintext message M using block cipher round modules 4111,4112. In the personalized block cipher 312, each round 'r' receives its own personalized round key '$PRK^i_r$' as input, which is derived from the received personalized key data $T_i(K)$ in the key partitioning module 511.

Figure 4:
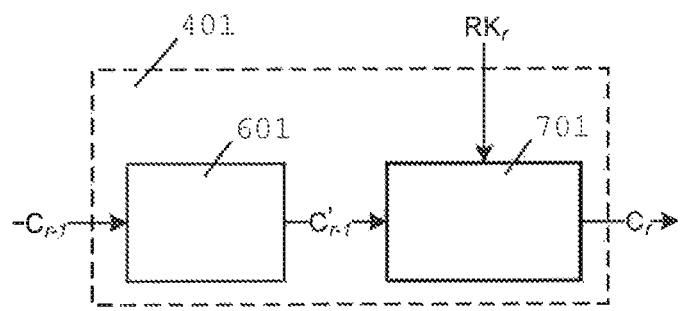
FIG. 4 shows a prior art block cipher round module.
Figure 13:
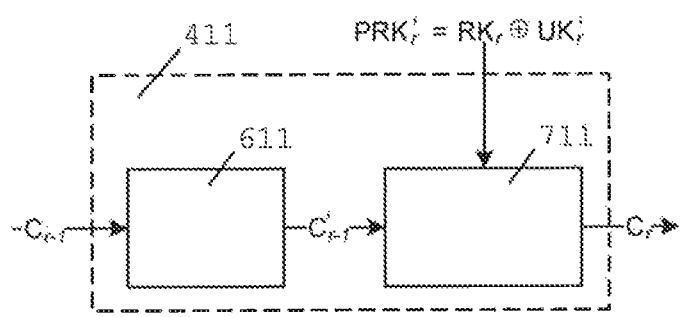
FIG. 13 shows a block cipher round module of an exemplary embodiment of the invention.

FIG. 13 shows an example of a personalized block cipher round module 412 that may be used as block cipher round module 4111,4112 as shown in FIG. 12. The block cipher round module 412 has a diffusion module 611 that operates similar to the diffusion module 601 shown in FIG. 4. The Personalized Round Key '$PRK^i_r$' is input to a personalized confusion module 711. The Personalized Round Key is calculated by applying a bitwise XOR with a Unique Key '$UK^i_r$' for round 'r' and personalized descrambler 'i'. A repeated XOR operation with the same Unique Key in the Personalized Confusion module removes the transformation of the Personalized Round Key.

Figure 7:
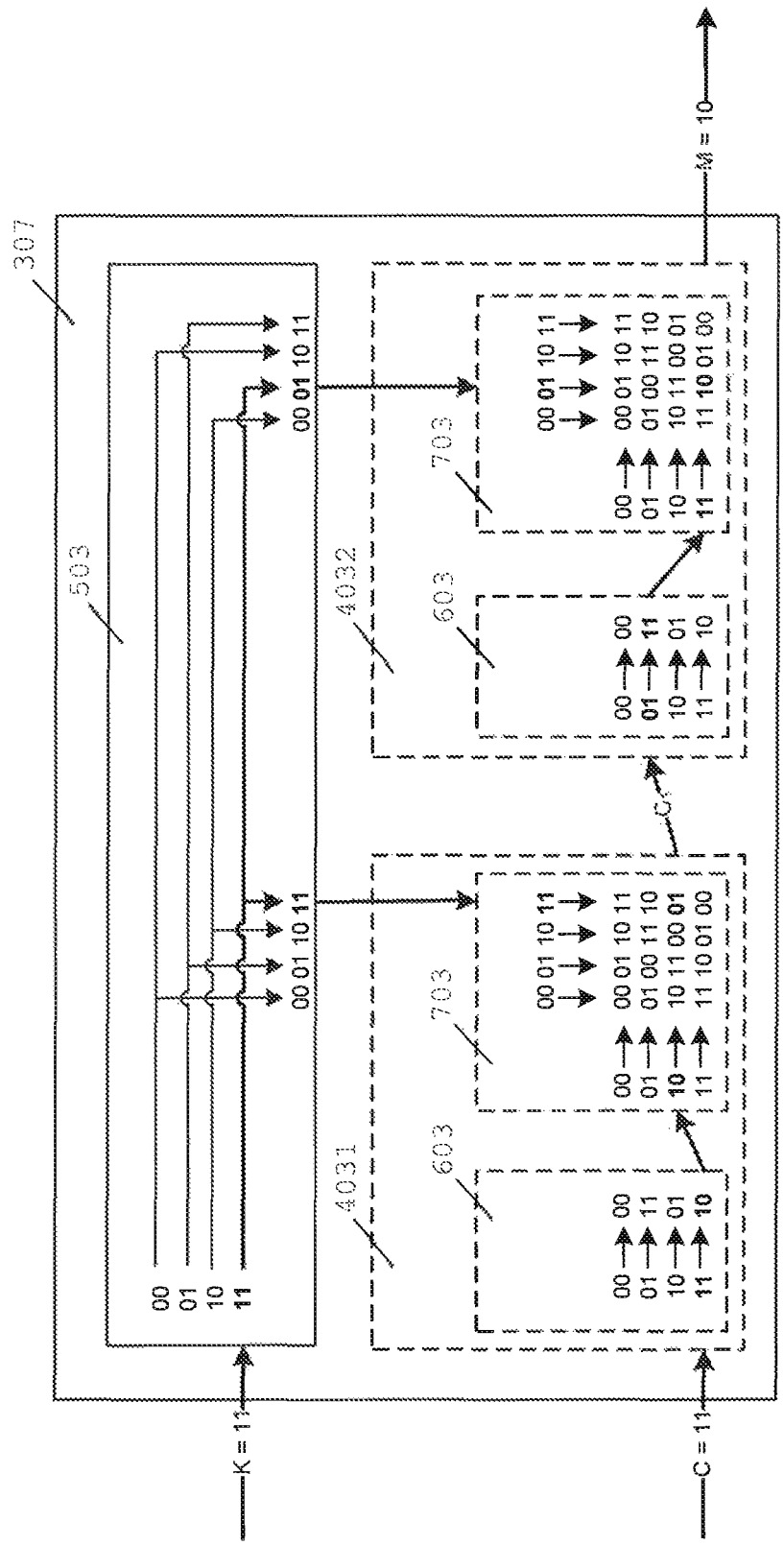
FIG. 7 shows a prior art block cipher based descrambler.
Figure 14:
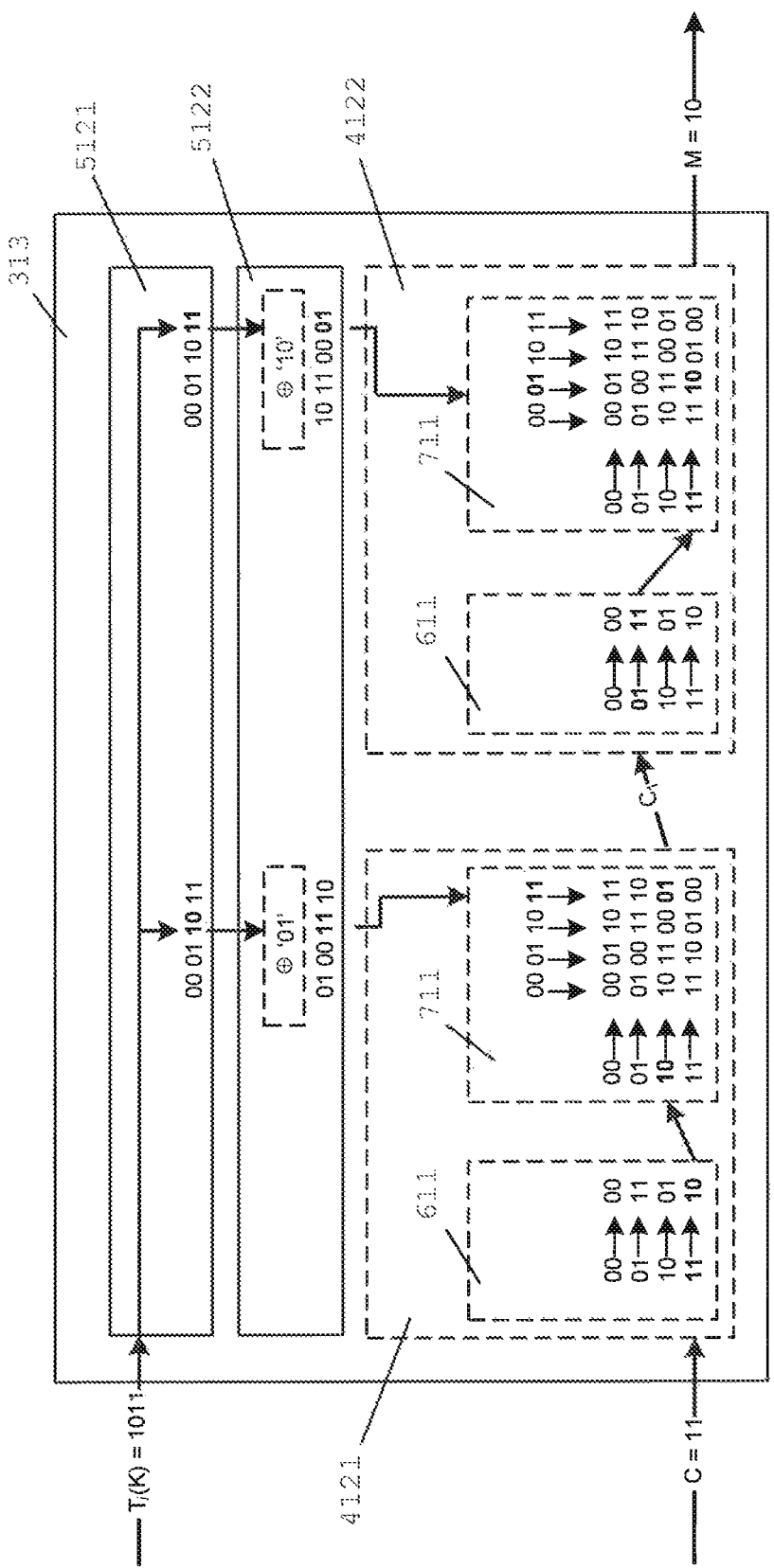
FIG. 14 shows a whitebox iterated block cipher based descrambler of an exemplary embodiment of the invention.

A simplified example of a whitebox lookup table driven implementation 313 of the personalized block cipher 312 of FIG. 12 is shown in FIG. 14. In the example of FIG. 14, a transformed binary key '$T_i(K)=1011$' is the personalized version of a common key 'K=11' as shown in the prior art example of FIG. 7. Moreover, the personalized key $T_i(K)$ has already been expanded in an external preprocessing module 811 from a two bit value to a four bit value. The block cipher round modules 4121,4122 operate in a similar manner as shown for the block cipher round modules 4031,4032 of FIG. 7. The exemplary embodiment of the invention of FIG. 14 differs from FIG. 7 in that the personalized descrambler 313 operates on the personalized input key $T_i(K)$.

In the example of FIG. 14, a key partitioning module 5121 selects a two-bit personalized round key '$PRK^i_r$' from the string of personalized round keys that are contained in the transformed key. The transformed key '$T_i(K)=1011$' is a concatenation of '$PRK^i_1=10$' and '$PRK^i_2=11$'. A personalizing module 5122 transforms each '$PRK^i_r$' using a XOR operation $\oplus$ with a preprogrammed Unique Key '$UK^i_r$'. Unique keys '$UK^i_1=11$' and '$UK^i_2=01$' are used to convert the personalized round keys into common round keys that are used in the block cipher round modules 4121,4122.

In FIG. 14, ciphertext 'C=11' is input to the first block cipher round module 4121. Diffusion module 611 uses a lookup table to change the input value 'C=11' into '10'. The confusion module 711 uses a lookup table to convert the value '10' into '01' using the first common round key value '11' to select the appropriate column of the lookup table. Intermediary result '$C_1=01$' is input to the second block cipher round module 4122. Diffusion module 611 uses a lookup table to change the input value '$C_1=01$' into '11'. The confusion module 711 uses a lookup table to convert the binary value '11' into '10' using the second common round key value '01' to select the appropriate column of the lookup table. Final result 'M=10' is the descrambled message.

Figure 15:
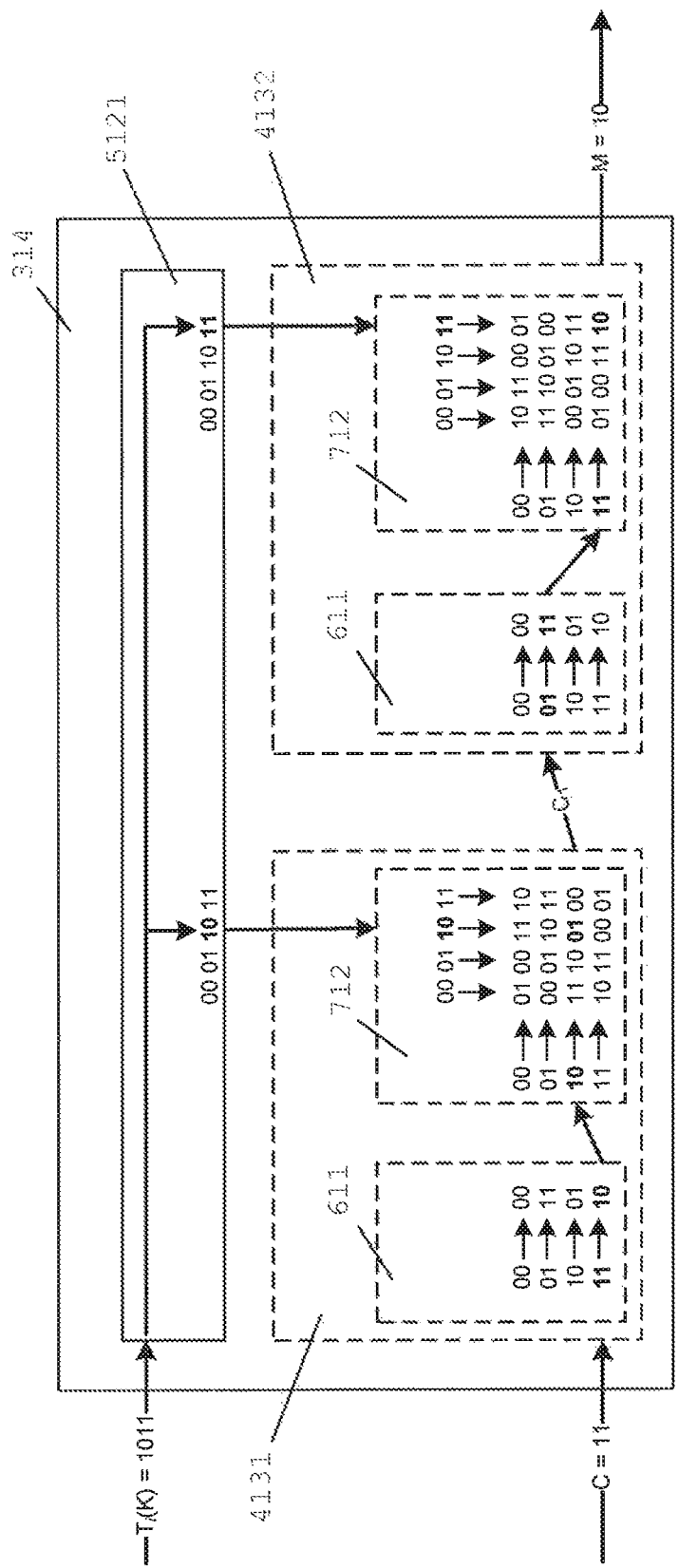
FIG. 15 shows a whitebox iterated block cipher based descrambler of another exemplary embodiment of the invention.

The XOR operation $\oplus$ as shown for the personalizing module 5122 may be integrated in the block cipher round modules 4121,4122. This is shown in FIG. 15, wherein a personalized confusion module 712 processes the '$PRK^i_r$' values as they are extracted from the transformed key '$T_i(K)=1011$'. The confusion module 712 is personalized by changing the column order of the lookup tables in the confusion module 712. The key partition module 5121 receives the transformed binary key '$T_i(K)=1011$' and partitions it into the two personalized round keys, '$PRK^i_1=10$' and '$PRK^i_2=11$'. The confusion modules 712 have been personalized by a specific arrangement of order of the columns to process a personal round key 'PRK' into the correct output. Another receiver will have differently personalized confusion modules and will not be able to decrypt the ciphertext with the transformed key for receiver 'i'.

In FIG. 15, ciphertext 'C=11' is input to the first block cipher round module 4131. Diffusion module 611 uses a lookup table to change the input value 'C=11' into '10'. The personalized confusion module 712 uses a lookup table to convert the value '10' into '01' using the first personal round key value '10' to select the appropriate column of the lookup table. Intermediary result '$C_1=01$' is input to the second block cipher round module 4132. Diffusion module 611 uses a lookup table to change the input value '$C_1=01$' into '11'. The personalized confusion module 712 uses a lookup table to convert the binary value '11' into '10' using the second personal round key value '11' to select the appropriate column of the lookup table. Final result '$M=10$' is the descrambled message.

Figure 16:
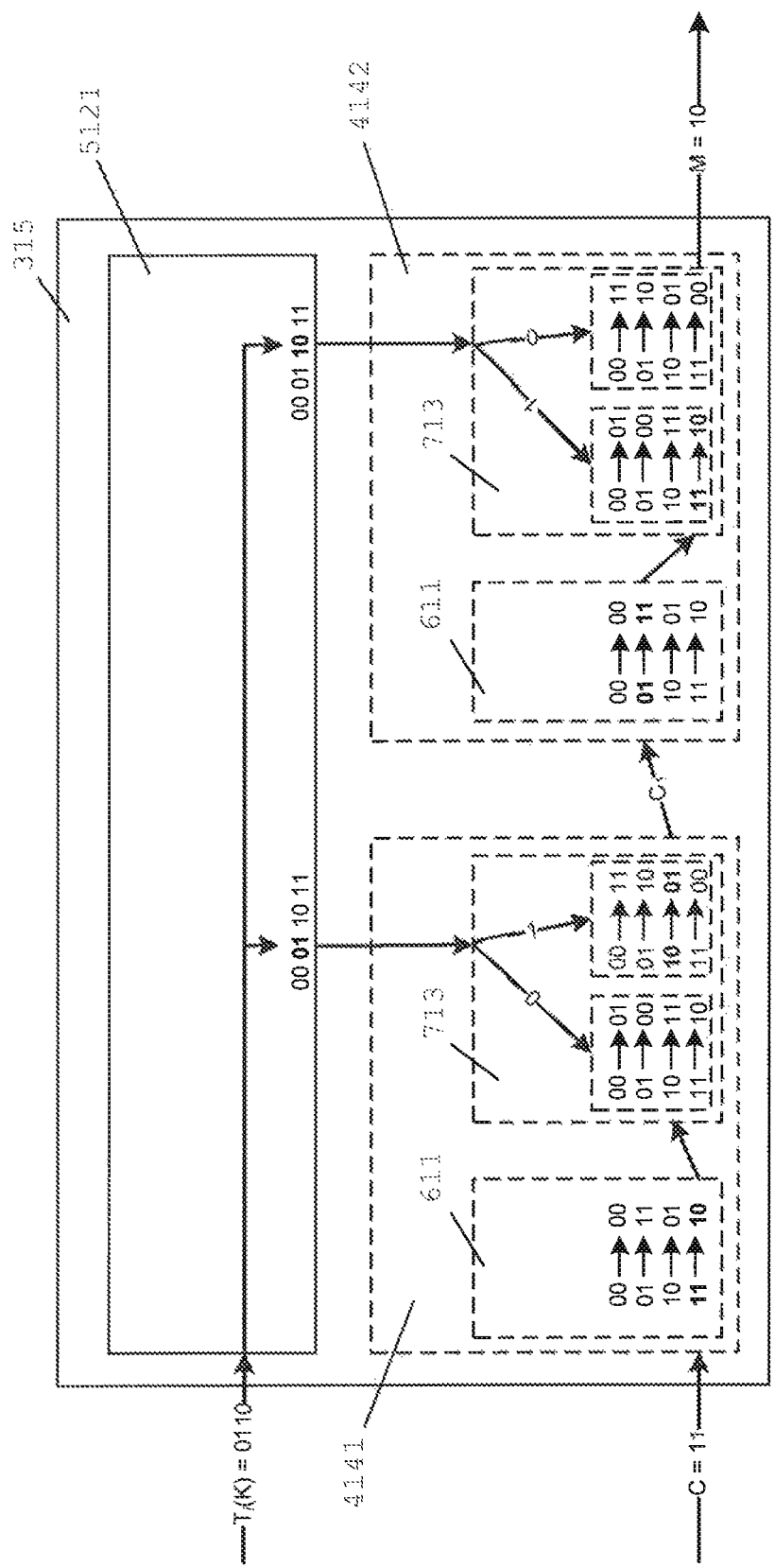
FIG. 16 shows a whitebox iterated block cipher based descrambler of another exemplary embodiment of the invention.

An alternative embodiment of a block cipher as personalized descrambler module is shown in FIG. 16, wherein the confusion functionality in each block cipher round function 4141,4142 is preprogrammed with a set of transformation tables. Each transformation table applies a data transformation, depending on the personalized round key '$PRK^i_r$' that is input to the block cipher round 4141,4142. In the example of FIG. 16 a transformed input binary key '$T_i(K)=0110$' is partitioned into two personalized round keys '$PRK^i_1=01$' and '$PRK^i_2=10$' in a key partitioning module 5121. In the personalized confusion modules 713, each bit of the personalized round key 'PRK' indicates whether the corresponding table should be used or not. In this way, the personalized confusion module 713 generates the correct output.

In FIG. 16, a two-bit ciphertext '$C=11$' is input to the first block cipher round module 4141. A diffusion module 611 transforms the ciphertext into binary value '10', which is input to the personalized confusion module 713. Personalized round key '$PRK^i_1=01$' is used by the personalized confusion module 713 of the first block cipher round module 4141 to determine which transformation tables are to be applied to the binary input '10'. The first bit of $PRK^i_1$ equals '0', which is interpreted as not to use the first transformation table. The second bit of $PRK^i_1$ equals '1', which is interpreted as to transform the input '10' to '01' in accordance with the second transformation table. The binary value '01' is provided to the second block cipher round module 4142, where the diffusion module 611 first transforms the data from '01' into '11'. This data is input to the personalized confusion module 713 of the second block cipher round module 4142. The first bit of $PRK^i_2$ equals '1', which is interpreted as to transform the input '11' to '10' in accordance with the first transformation table. The second bit of $PRK^i_2$ equals '0', which is interpreted as not to use the second transformation table on the result after the first transformation table. The output of the second block cipher round module 4142 is the final result of the personalized descrambler 315, thus the descrambled message equals '$M=10$'.

Different receivers with a block cipher as shown in FIG. 16 are typically preprogrammed with different personalized confusion modules, i.e. with a different set of transformation tables in the personalized confusion modules, and will therefore advantageously not be able to decrypt the input ciphertext C with an intercepted transformed input binary key '$T_i(K)$' of other receivers.

It is to be understood that the invention is not limited to two-bit data operations with two block cipher rounds as shown in the various examples. For example, AES block ciphers typically use a 128-bit cipher block size and a key size of 128, 192 or 256 bits in 10, 12 or 14 block cipher rounds. For example, DES block ciphers typically use a 64-bit cipher block size and a 56-bit key size in 16 block cipher rounds.

The following exemplary embodiments show how a personalized descrambler may be secured using personalized whitebox descramblers based on stream ciphers.

Figure 18:
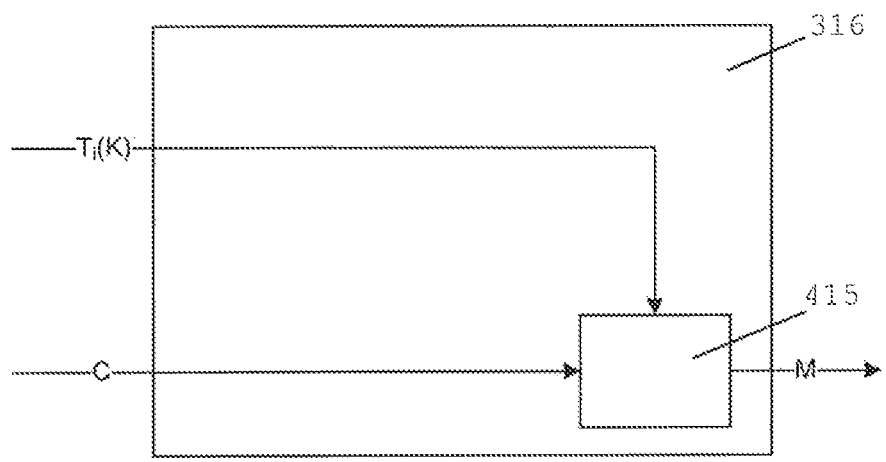
FIG. 18 shows a whitebox stream cipher based descrambler of an exemplary embodiment of the invention.

FIG. 18 shows and example of a personalized whitebox stream cipher module 316. Preprocessed key related data $T_i(K)$ is input to the personalized stream cipher module 316. $T_i(K)$ contains a preprocessed key K that has been preprocessed by a setup function and a key expansion function in a preprocessing module 811 external to the personalized stream cipher module 316. Moreover, the preprocessed key K is transformed. $T_i(K)$ is input to a XOR module 415 for descrambling a ciphertext C. Similar to the working of the tables in the personalized confusion modules of the block cipher embodiments, the XOR tables in the XOR module are personalized to inverse the transformation.

Figure 19:
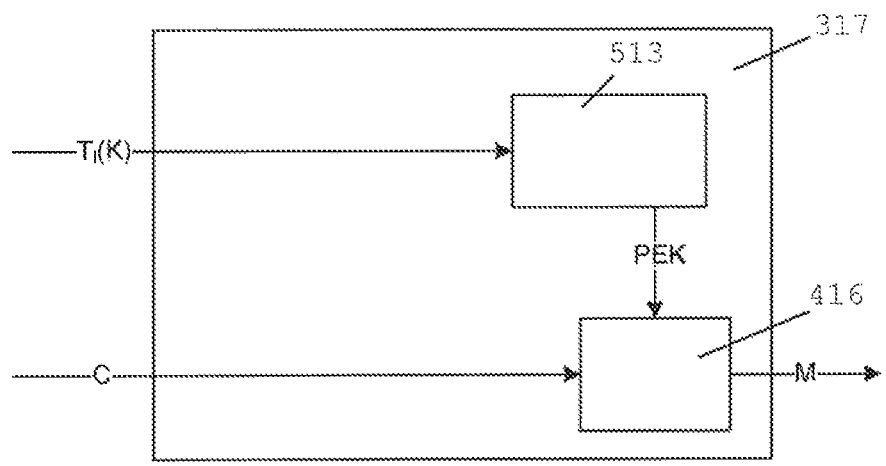
FIG. 19 shows a whitebox stream cipher based descrambler of another exemplary embodiment of the invention.

FIG. 19 shows an example of an alternative personalized whitebox stream cipher module 317. Preprocessed key related data $T_i(K)$ is input to the personalized stream cipher module 317. $T_i(K)$ contains a preprocessed key K that has been preprocessed by a setup function in a preprocessing module 811 external to the personalized stream cipher module 317. Moreover, the preprocessed key K is transformed. $T_i(K)$ is input to a key expansion module 513 to obtain a personalized expanded key PEK. The PEK is input to a XOR module 416 for descrambling a ciphertext C. Similar to the working of the tables in the personalized confusion modules of the block cipher embodiments, the XOR tables in the XOR module may be personalized to inverse the transformation. Alternatively the key expansion module 513 performs the inverse transformation.

The following exemplary embodiment shows how a personalized descrambler may be secured using personalized whitebox descramblers based on a public key cipher.

Figure 21:
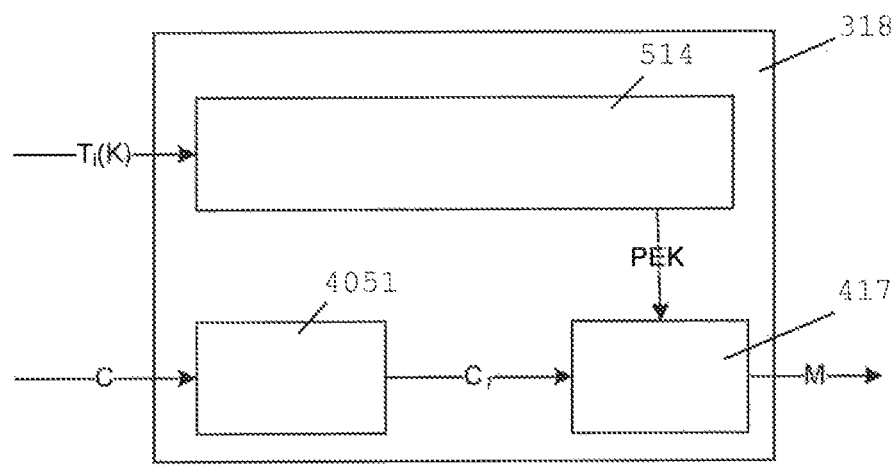
FIG. 21 shows a whitebox public key based descrambler of an exemplary embodiment of the invention.

FIG. 21 shows an example of a personalized public key cipher module 318. The value of the key K is hidden by setting $T_i(K)=\{K-K1\}$ in an external preprocessing module 811. A personalized exponentiation module 514 calculates a personalized expanded key '$PEK=G^{(K+K1)} \mod N$' using input $T_i(K)$. Thus a personalized version of the public key algorithm is created by varying the value of '$K1$'. The obtained expanded personalized key PEK is input to a personalized decipher module 417 for deciphering an input ciphertext C. As part of the deciphering of ciphertext C, the ciphertext C may be modified in modification module 4051 into an intermediate ciphertext $C_1$ prior to being input to the personalized decipher module 417.

Figure 22:
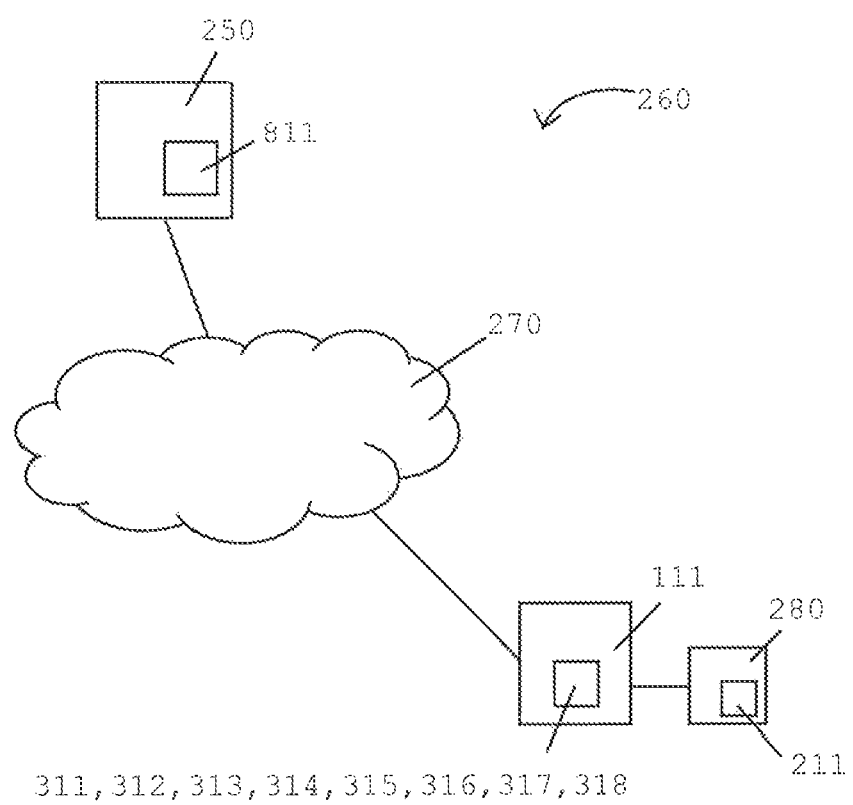
FIG. 22 shows a conditional access system of an exemplary embodiment of the invention.

FIG. 22 shows a conditional access system 260 of an exemplary embodiment of the invention. A head-end system 250 transmits ECMs, EMMs and a content stream scrambled with a CW (i.e. a ciphertext) to one or more receivers 111 via a distribution network 270. The ECM typically contains one or more encrypted CWs. The ECMs are processed by a secure device 280 that is communicatively connected to the receiver 111. The receiver contains a personalized descrambler 311, 312, 313, 314, 315, 316, 317 or 318. The secure device 280 is e.g. a smartcard and typically contains a secure client 211 as described with FIG. 11. The CWs are preprocessed in a preprocessing module 811 in the head-end system 250 or alternatively in a preprocessing module 811 in the secure client 211.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory or flash memory) on which alterable information is stored. Moreover, the invention is not limited to the embodiments described above, which may be varied within the scope of the accompanying claims.

The invention claimed is:

1. A whitebox descrambler for descrambling a ciphertext to obtain a cleartext message, wherein the descrambler is executed in a computer processor and is configured to implement operations including:
receiving a personalized transformed key from an external preprocessing module, the personalized transformed key comprising preprocessed data as a result of applying a first part of a descrambling operation in the external preprocessing module;
receiving the input ciphertext;
generating an output data by applying a second part of the descrambling operation to the input ciphertext using the personalized transformed key as an input to the second part of the descrambling operation, including:
splitting the personalized transformed key in a predefined number of transformed key parts of equal bit length;
for each transformed key part, receiving, in a block cipher round module, an input ciphertext data and selecting, from a lookup table, an output at a location indicated by a first bit pattern of the input ciphertext data and a second bit pattern based on the transformed key part; and
applying an inverse transformation to the personalized transformed key before generating the output data.

2. The descrambler according to claim 1,
wherein a first block cipher round module is configured to use a part of a predefined bit length of the ciphertext as the input ciphertext data and wherein subsequent block cipher round modules are configured to use an output data of a previous block cipher round module as the input ciphertext data.

3. The descrambler according to claim 2, wherein the block cipher round module comprises a diffusion module and a confusion module, wherein the lookup table is a part of the confusion module, and wherein the diffusion module is configured to modify the input ciphertext data prior to being input to the confusion module.

4. The descrambler according to claim 3, further comprising a personalizing module configured to apply the inverse transformation to the transformed key part to thereby obtain the second bit pattern.

5. The descrambler according to claim 3, wherein the second bit pattern is the transformed key part, and wherein the output data in the lookup table at the location indicated by the first bit pattern of the input ciphertext data and the second bit pattern of the transformed key part has a preconfigured value corresponding with the inverse transformation of the transformed key part.

6. The descrambler according to claim 5, wherein the confusion module comprises a lookup table for each bit of the second bit pattern, and wherein the confusion module is configured to skip or use the lookup table depending on a value of the bit of the second bit pattern.

7. The descrambler according to claim 1, wherein the descrambler comprises a whitebox stream cipher based descrambler or a whitebox public key based descrambler.

8. A receiver for use in a conditional access system, comprising the descrambler according to claim 1.

9. A secure client for use in a conditional access system, comprising:
an input for receiving an encrypted control word from a head-end system via the intermediary of a receiver having a lookup table;
a memory configured to store a product key;
a decryption module configured to decrypt the encrypted control word using the product key to obtain the control word;
a preprocessing module configured to apply a first part of a descrambling operation to the control word to obtain a modified control word and to transform the modified control word to obtain a personalized transformed control word; and
an output for providing the personalized transformed control word to the receiver having the preconfigured lookup table.

10. A head-end system for use in a conditional access system, comprising:
a preprocessing module configured to apply a first part of a descrambling operation to a control word to obtain a modified control word and to transform the modified control word to obtain a personalized transformed control word; and
an output for providing the personalized transformed control word and a ciphertext to the receiver according to claim 8.

11. A method for use in a whitebox descrambler for descrambling a ciphertext to obtain a cleartext message, the method comprising:
receiving a personalized transformed key from an external preprocessing module, the personalized transformed key comprising preprocessed data as a result of applying a first part of a descrambling operation in the external preprocessing module;
receiving the input ciphertext;
generating an output data by applying a second part of the descrambling operation to the input ciphertext using the personalized transformed key as an input to the second part of the de scrambling operation, including:
splitting the personalized transformed key in a predefined number of transformed key parts of equal bit length;
for each transformed key part: receiving, in a block cipher round module, an input ciphertext data and selecting from a lookup table at a location indicated by a first bit pattern of the input ciphertext data and a second bit pattern based on the transformed key part; and
applying an inverse transformation to the personalized transformed key before generating the output data.

12. The method according to claim 11,
wherein a first block cipher round module uses a part of a predefined bit length of the ciphertext as the input ciphertext data and wherein subsequent block cipher round use an output data of a previous block cipher round module as the input ciphertext data.

13. The method according to claim 12, wherein applying the inverse transformation to the transformed key part to thereby obtain the second bit pattern.

14. The method according to claim 12, wherein the second bit pattern is the transformed key part, and wherein the output data in the lookup table at the location indicated by the first bit pattern of the input ciphertext data and the second bit pattern of the transformed key part has a preconfigured value corresponding with the inverse transformation of the transformed key part.

15. The method according to claim 14, wherein generating the output data comprises using a lookup table for each bit of the second bit pattern depending on a value of the bit of the second bit pattern.

16. A computer program stored on a non-transitory computer readable memory, which, when being executed by a processor, is adapted to carry out a method for use in a whitebox descrambler according to claim 11.

17. A method for use in a secure client of a conditional access system, comprising:
   receiving an encrypted control word from a head-end system via the intermediary of a receiver having a preconfigured lookup table;
   decrypting the encrypted control word using a product key from a memory to obtain the control word;
   applying a first part of a descrambling operation to the control word to obtain a modified control word;
   transforming the modified control word to obtain a personalized transformed control word; and
   providing the personalized transformed control word to the receiver having the preconfigured lookup table.

18. The descrambler according to claim 1, wherein the personalized transformed key comprises a first bit sequence of a control word and a second bit sequence.

19. The secure client according to claim 9, wherein the preprocessing module is configured to expand the control word.

20. The method according to claim 17, comprising:
   expanding the control word to obtain the personalized transformed control word.

* * * * *